A. WHITTIER.
DRINKING FOUNTAIN.
APPLICATION FILED JAN. 30, 1911.
1,036,046.
Patented Aug. 20, 1912.
2 SHEETS—SHEET 2.
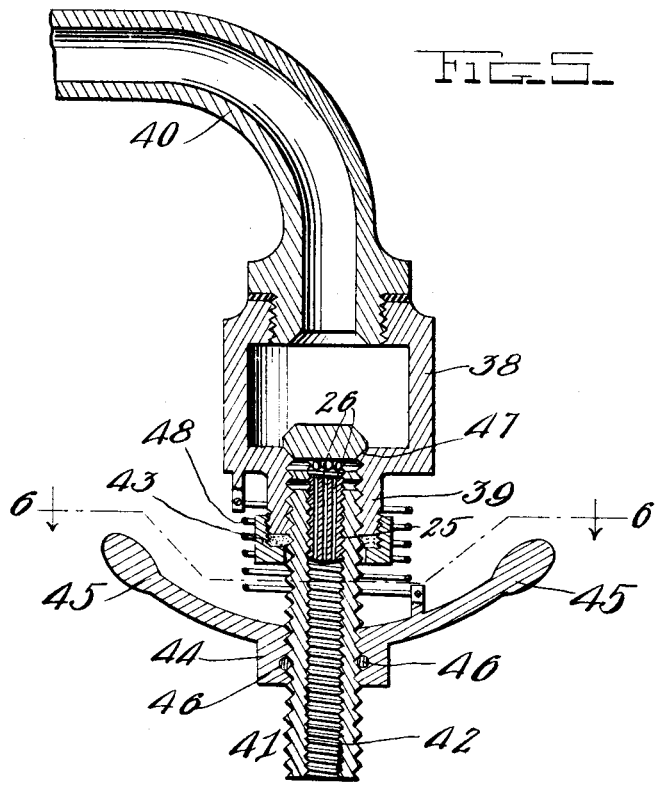
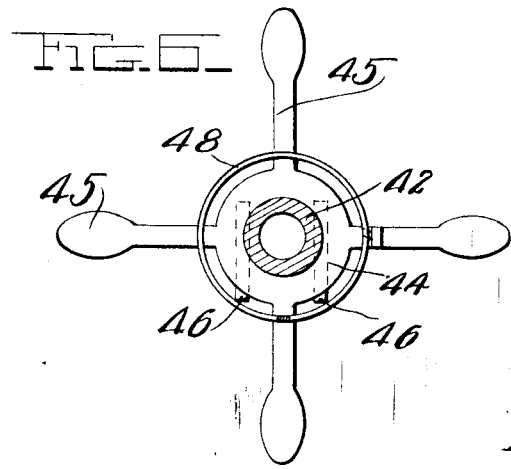
Witnesses
J. R. Pierce
O. B. Hopkins
Inventor
A. Whittier.
by H. B. Willson & Co
Attorneys

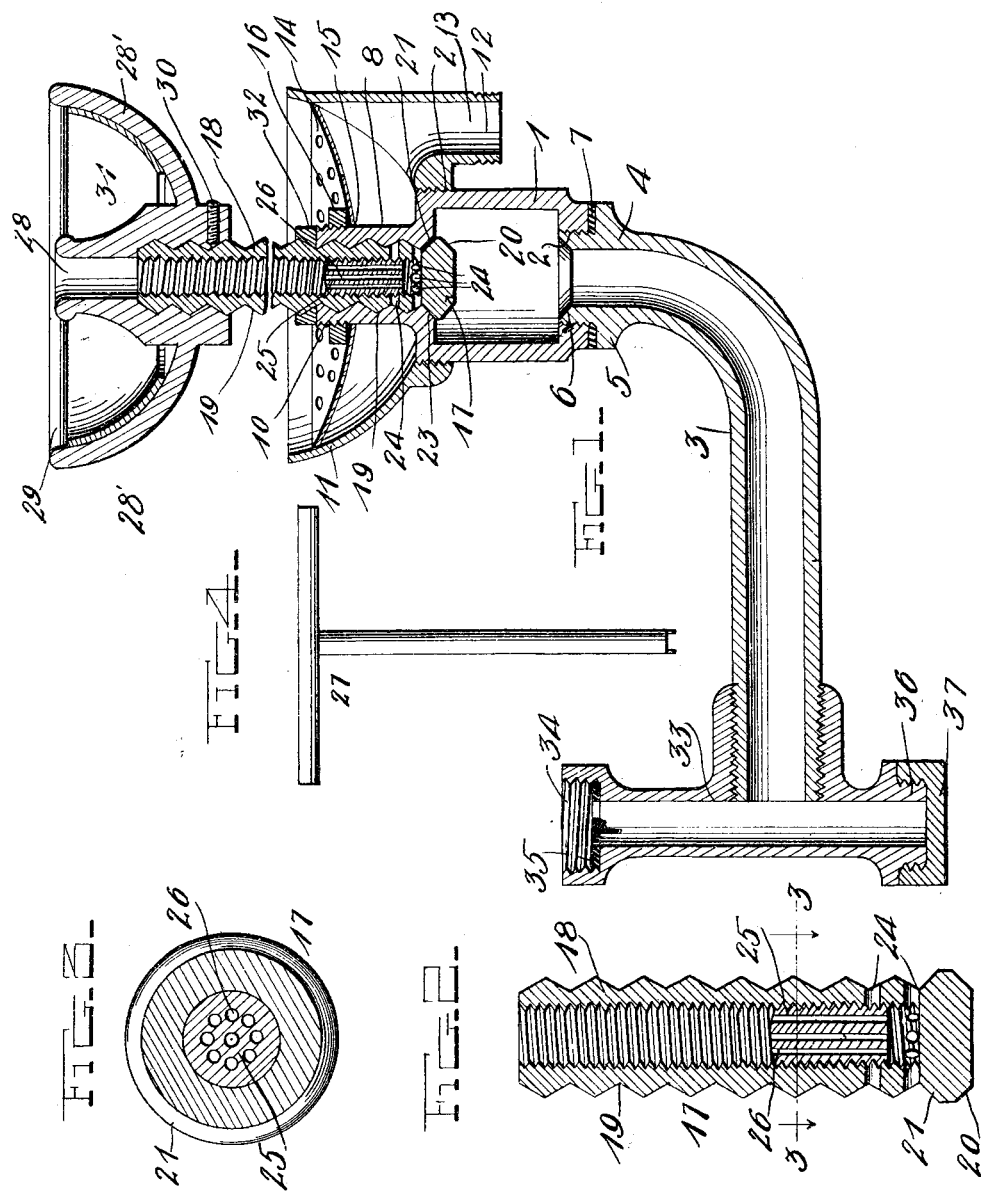

UNITED STATES PATENT OFFICE.

ARTHUR WHITTIER, OF EAST WALPOLE, MASSACHUSETTS

DRINKING-FOUNTAIN.

1,036,046.

Specification of Letters Patent. Patented Aug. 20, 1912.

Application filed January 30, 1911. Serial No. 605,537.

*To all whom it may concern:*

Be it known that I, ARTHUR WHITTIER, a citizen of the United States, residing at East Walpole, in the county of Norfolk and State of Massachusetts, have invented certain new and useful Improvements in Drinking-Fountains; and I do declare the following to be a full, clear, and exact description of the invention, such as will enable others skilled in the art to which it appertains to make and use the same.

This invention relates to improvements in drinking fountains.

One object of the invention is to improve the construction of the fountain shown in my pending application, Serial Number 589,943, filed October 3, 1910, whereby the fountain will automatically close after being used and whereby the flow of the water through the fountain may be regulated according to the pressure or force of the water.

Another object is to provide a fountain of this character adapted to be inverted and employed as a self-closing faucet.

With these and other objects in view, the invention consists of certain novel features of construction, combination and arrangement of parts as will be more fully described and particularly pointed out in the appended claims.

In the accompanying drawings: Figure 1 is a vertical sectional view of my improved fountain; Fig. 2 is an enlarged vertical sectional view of the main valve of the fountain and the auxiliary regulating valve arranged therein; Fig. 3 is a cross sectional view of the same on the line 3—3 of Fig. 2; Fig. 4 is a side view of the key or wrench for adjusting the auxiliary valve; Fig. 5 is a vertical sectional view of a modified form of the fountain showing the same inverted and arranged for use as a faucet; Fig. 6 is a horizontal sectional view of the same on the line 3—6 of Fig. 5.

In the embodiment of the invention I provide a valve casing 1 having in its lower end a water inlet opening 2 into which is adapted to be screwed the outer end of a water supply pipe 3. The pipe 3 may be connected directly to a service pipe or as here shown may be connected to a faucet. The outer end of the pipe 3 is provided with an exterior thread 4 and adjacent thereto an annular flange 5. The edge of the pipe-bore at its outlet end is beveled as shown to form a valve seat 6. The valve casing 1 is adapted to be screwed onto the threads 4 of the pipe 3 and into engagement with the flange 5 and if desired a washer 7 may be arranged on the flange thereby forming a fluid tight joint between the valve casing and the pipe 3.

The upper portion of the valve casing is exteriorly threaded and on the upper end of the casing is formed a reduced neck 8 which is provided on its inner surface throughout its entire length with coarse or rapid pitch screw threads 9 and on its upper end is exteriorly threaded as at 10. On the threaded outer surface of the valve casing is screwed the lower end of a bowl shaped catch basin 11 in one side of which is formed a drain opening 12 having a downwardly projecting discharge nipple 13 to the lower end of which is adapted to be connected a drain pipe (not shown). Arranged in the catch basin 11 is a perforated strainer plate 14 in the center of which is formed an aperture 15 through which the upper end of the neck 8 projects. The outer edges of the plate 14 closely engage the inner walls of the catch basin 11 and said plate is securely fastened in the basin by means of a nut 16 which is screwed into engagement with the threads 10 on the upper end of the neck and into engagement with the upper side of the plate 14 thereby depressing or forcing the inner portion of the plate downwardly so that the latter is dished or concaved as shown. The strainer plate 14 serves the two-fold purpose of preventing any foreign matter which may be thrown into the catch basin from entering and clogging the discharge opening 12 therein and also serves to prevent the water from being dipped from the basin by a cup or other receptacle.

Arranged in the valve casing 1 is a double valve 17 having a tubular valve stem 18 open at its upper end and provided on its outer side with coarse or rapid screw threads 19 whereby said stem is screwed up and down in the coarse interior threads 9 of the neck 8 of the casing. The valve 17 is provided on its outer edge with a lower annular beveled surface 20 and an upper annular beveled surface 21. When the valve stem is screwed down in the neck 8 a sufficient extent the lower beveled surface 20 of the valve will be brought into engagement with the seat 6 formed on the upper end of the water supply pipe 3 thereby closing this end of the pipe and cutting off the supply of water to the fountain. When the valve is screwed upwardly a sufficient extent in the neck 8 of the valve casing the upper beveled surface 21 of the valve will be brought into engagement with an annular valve seat 23 formed on the lower inner end of the neck 8 as shown. When the valve is thus brought into engagement with the seat 23 the water will also be cut off from the fountain. By providing the valve stem 18 with the coarse screw threads 19 arranged as here shown and described the pressure of water on the lower side of the valve will automatically close it when the pressure on the upper end thereof is removed, by causing the coarsely threaded stem to move upwardly in the neck 8 as will be readily understood.

In the lower portion of the tubular valve stem 18 are formed upper and lower rows or series of radial perforations 24 through which the water passes from the valve casing 1 into the tubular stem of the valve when the latter is open, and thence through the stem to the discharge nozzle hereinafter described. In order to regulate the flow of water through the valve stem, to correspond with the pressure or force of the water entering the fountain, I provide an auxiliary valve 25 comprising an exteriorly threaded plug adapted to be screwed into the tubular stem 18, said stem being threaded interiorly to receive said plug. In the plug are formed longitudinally disposed passages 26 which extend through it. By thus arranging the valve 25 it may be adjusted in the valve stem to cover and uncover one or more of the rows of perforations 24 in the stem 18 of the valve thus permitting a greater or less quantity of water to enter the valve stem and pass through the passages 25 thereby controlling or regulating the flow of the water to the fountain. In order to facilitate the adjustment of the valve 25, a wrench or other suitable instrument 27 is provided having on its lower end teeth or studs adapted to be engaged in the upper ends of the passages 26 when said wrench is inserted in the upper open end of the valve stem, whereby the valve 25 may be screwed downwardly or upwardly in the stem of the main valve 17.

On the upper end of the tubular valve stem 18 is screwed a discharge nozzle 28 on which is formed a series of radially disposed and upwardly curved arms 28' the upper ends of which are formed integral with a combined guard ring and hand wheel 29. The nozzle 27 when screwed onto the upper end of the tubular valve stem is securely locked thereto by a set screw 30. The guard ring 29 is provided to prevent the lips from coming in contact with the upper end of the discharge nozzle or other metal parts of the fountain when drinking therefrom and also serves as a means for screwing the tubular valve stem 18 and valve 17 downwardly in the valve casing to open the valve and permit the water to bubble or discharge from the upper end of the nozzle to a sufficient height for drinking. In the supporting arms of the guard ring 29 is arranged an annular shield or guard plate 31 which prevents the water from being caught in a receptacle when falling into the catch basin 11.

After the fountain has thus been opened and a drink obtained therefrom the guard ring or hand wheel 29 is released whereby the pressure of water in the valve casing 1 against the lower side of the valve 17 will cause said valve to automatically close in the manner described. In order to provide for fastening the valve in closed position for any reason, I preferably provide a locking nut 32 adapted to be screwed down on the valve stem 18 and into engagement with the upper end of the neck 8 thereby locking the valve stem and main valve 17 against movement. Engaged with the inner end of the water supply pipe 3 is a T coupling 33 in the upper end of which is formed an interiorly threaded socket 34 in which is arranged a washer 35 and which is adapted to be screwed into engagement with a faucet. On the lower end of the coupling member 33 is formed an exteriorly threaded flanged head 36 which is here shown as being closed by a cap 37 but which may have connected thereto a water conducting pipe (not shown.)

In Figs. 5 and 6 of the drawings, is shown a modified construction and arrangement of my improved fountain wherein the same is employed as a self-closing faucet. In using the fountain as a faucet the catch basin 11, 10 strainer 14, nozzle 28 and guard ring 29 are removed and the valve casing is inverted so that the tubular valve stem projects downwardly as shown. In this form of the device the valve casing 38 and the neck 39 thereof are somewhat shorter than the same parts shown in Fig. 1 of the drawing and the water supply pipe 40 is connected with the service pipe to support the casing in an inverted position as shown. The main valve 41 which corresponds to the valve 17 in Fig. 1 is provided with a tubular valve stem 42 corresponding to the valve stem 18 except that the threads on the outer surface of the stem are not sufficiently coarse to cause the valve to close by the pressure of water thereon. In this form of the device the stem 42 is preferably provided with a stuffing box 43 which is screwed upon the lower end of the neck 39 of the valve casing to prevent any possible leakage between the valve stem and the valve casing.

On the lower portion of the valve stem is screwed an operating wheel 44 comprising a hub having a series of radially projecting upwardly curved arms 45. The hand wheel 44 is screwed upwardly on the lower portion of the valve stem to the desired position and is locked in this position by binding screws 46 arranged in the hub of the wheel as shown. By thus arranging the hand wheel it may be readily turned in the proper direction to screw the valve stem upwardly and disengage the valve from the lower valve seat 47 in the valve casing thus permitting the water to flow through the tubular stem of the valve. In order to cause the valve to automatically close when the hand wheel 44 is released I provide a coiled spring 48 one end of which is connected to a lug projecting from the lower end of the valve casing 38 and the other end to a lug projecting from one of the arms 45 of the wheel 44 whereby when said wheel is turned in the proper direction to open the valve the spring will be wound up and when the wheel is released the pressure of the spring will turn the wheel and the valve stem in the opposite direction thus screwing the valve stem downwardly and closing the valve. In the valve 41 is arranged the auxiliary regulating valve 25, whereby the amount of water which may pass through the valve stem when the valve is open may be adjusted.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as defined in the appended claims.

Having thus described my invention, what I claim is:

1. In a drinking fountain, a valve casing, a main valve therein, a tubular valve stem formed on said valve and having a threaded engagement with said casing, said stem having formed therein series of perforations, and an auxiliary valve adjustably mounted in said valve stem and adapted to open and close the perforations therein whereby the flow of water through said stem is regulated, said auxiliary valve having formed therein a series of water discharge passages.

2. In a drinking fountain, a valve casing, a main valve arranged in said casing, a tubular stem formed on said valve and having a series of perforations, an auxiliary valve comprising an apertured plug adapted to be screwed into said tubular stem to open and close said perforations whereby the flow of water through the stem is regulated, a discharge nozzle arranged on the stem of the valve, and means to prevent the lips from being brought into engagement with the nozzle.

3. In a drinking fountain, a valve casing, a neck formed on one end of said casing, said neck being provided with coarse interior screw threads, a valve arranged in said casing, a tubular valve stem formed on said valve, said stem having formed therein a series of perforations and having a threaded inner surface and a coarsely threaded outer surface engaging said coarsely threaded neck, an auxiliary valve comprising an exteriorly threaded apertured plug adapted to be screwed into said tubular valve stem to open and close the perforations therein whereby the flow of water through said stem is regulated, means to lock said stem against movement and thereby hold said main valve in closed position, a discharge nozzle arranged on the stem of the valve and means to prevent the lips from being brought into engagement with the nozzle.

4. A fountain of the character described comprising a valve, a hollow stem formed thereon, the shell of which is provided with series of perforations and interiorly threaded, and a longitudinally apertured plug exteriorly threaded to engage in the stem, whereby more or less of the perforations may be opened or closed at will.

5. The herein described valve comprising a casing having a neck provided with a seat where it opens into the casing, the neck having internal threads of rapid pitch, a valve adapted to be closed against said seat by the pressure of water and having a tubular stem projecting into said neck and provided with threads adapted to engage those therein, the stem being pierced with perforations adjacent said valve and internally threaded, and a plug having external threads to engage those within the stem and its body pierced with longitudinal passages.

6. The herein described valve comprising a casing having a neck provided with a seat where it opens into the casing, a valve adapted to be closed against said seat by the pressure of water and having a tubular stem projecting into said neck, the stem being pierced with perforations adjacent said valve and internally threaded, and a plug having external threads to engage those within the stem and its body pierced with longitudinal passages.

In testimony whereof I have hereunto set my hand in presence of two subscribing witnesses.

ARTHUR WHITTIER

Witnesses:
JOHN PATRICK LYONS,
BENJAMIN S. WHITTIER.